United States Patent [19]

Hollandsworth et al.

[11] 4,274,738
[45] Jun. 23, 1981

[54] ROTARY BODY RUN-OUT REMOTE SENSING METHOD AND APPARATUS ESPECIALLY APPLICABLE TO VEHICLE WHEEL ALIGNERS

[75] Inventors: William J. Hollandsworth, Town & Country; Dean O. Grubbs, Manchester, both of Mo.

[73] Assignee: Hunter Engineering Company, Bridgeton, Mo.

[21] Appl. No.: 48,624

[22] Filed: Jun. 14, 1979

[51] Int. Cl.³ .......................................... G01B 11/275
[52] U.S. Cl. ................................. 356/155; 33/203.18; 33/288
[58] Field of Search ............... 33/203.18, 203.19.203.2, 33/203.21, 288, 336; 356/155

[56] References Cited

U.S. PATENT DOCUMENTS

| 3,199,208 | 8/1965 | Hunter | 33/348 |
| 3,892,042 | 7/1975 | Senften | 356/155 |
| 4,138,825 | 2/1979 | Pelta | 33/336 |

*Primary Examiner*—R. A. Rosenberger
*Attorney, Agent, or Firm*—Gravely, Lieder & Woodruff

[57] ABSTRACT

Apparatus for compensation of vehicle wheel alignment measurements in which plano-reflective means mounted on certain wheels cooperate with radiant energy projector means mounted on other wheels to have radiant energy sensor means carried thereby in position to pick up the radiant energy returned from the plano-reflective means, such that alignment compensation of the first mentioned wheels may be measured including compensation for the lateral or wobble run-out. The apparatus is also capable of compensating camber measurement of the first mentioned wheels with the aid of camber measuring means associated with the support for the plano-reflective means.

11 Claims, 3 Drawing Figures

ROTARY BODY RUN-OUT REMOTE SENSING METHOD AND APPARATUS ESPECIALLY APPLICABLE TO VEHICLE WHEEL ALIGNERS

BACKGROUND OF THE INVENTION

Electronic instrumentation of vehicle wheel alignment examination has progressed in stages from the work disclosed by Senften in U.S. Pat. No. 3,782,831 of Jan. 1, 1974 where toe alignment characteristics of steerable wheels was worked out using a light beam sweeping across a reference line or axis and generating a signal when an opposing photosensitive element registered seeing the light beam. At the moment in time the photosensitive element detects the light beam, the potentiometer voltage is fed into a memory device and is the analog of the angular orientation of the wheel relative to the reference line or axis. There then followed the further disclosure of Senften in U.S. Pat. No. 3,892,042 of July 1, 1975 by which electronic means was applied to compensating the presence of wobble or lateral run-out in the vehicle wheel so that the plane of rotation of the wheel could be found for purposes of alignment determination. In this disclosure the sensing means was mounted on the wheel being examined.

The work of others acknowledged the Senften developments, and in the U.S. Pat. No. of Lill 4,097,157 of June 27, 1978 there was disclosed the application of electronics to determining the alignment of steerable vehicle wheels in relation to the axis of rotation of a single non-steerable wheel. The means associated with the non-steerable wheel took the form of a reflective mirror which was merely assumed to be in a fixed position at right angles to the longitudinal axis of the vehicle when mounted on that wheel.

The continuing work of Senften resulted in the disclosure in U.S. Pat. No. 4,126,943 of Nov. 28, 1978 of electronic means applied to correlating the individual alignment of non-steerable vehicle wheels and the steerable wheels so that the thrust effect of the non-steerable wheels could be applied to alignment of the steerable wheels for improved steering and directional control of a vehicle. There was also the disclosure of Florer et al in U.S. Pat. No. 4,095,902 of June 20, 1978 directed to a method and apparatus for measuring toe angles of vehicle steering wheels wherein electronic circuits were utilized for computing angular displacement of each of the front wheels in relation to a thrust line reference determined by the position of the rear wheels of the vehicle.

An automatic wheel alignment instrument controlled by a microprocessor was disclosed by Chang in the IECI 1978 Processings of March 20–22, 1978 in Industrial Applications of Microprocessors. This was a general discussion of the subject in which servo accelerometers were pointed out as useful tools for camber determination of vehicle wheels. It was also pointed out that camber and toe are alignment characteristics perpendicular to each other, and if certain facts are known the run out corrections can be made from only one sensor. The obtaining of the facts was not disclosed.

BRIEF DESCRIPTION OF THE INVENTION

This invention relates to apparatus for determining the alignment conditions of vehicle wheels by remotely located sensor, and particularly the alignment conditions of certain of wheels.

The objects of the invention are to provide apparatus whereby the angular position of a rotatable body in orthogonal coordinates may be determined by remotely located sensor means having a fixed position spaced from the rotatable body, to provide a method of applying the foregoing apparatus to vehicle wheel alignment determining operations, and to provide electronically responsive means to the problem of finding run-out parameters when sensed by the apparatus.

It is a further object of the present invention to provide means capable of sensing angular positional data about a rotatable body where the sensing means is remote from the rotating body.

Another object of the present invention is to provide target means on a body whose angular position is to be determined for producing a motion which follows the motion of the body, and to remotely sense that motion in such a way that increments of motion can be recognized and identified.

The embodiment of the present invention which sets forth the principles thereof involves simple mounting units for plano-reflective means attached to select ones of the vehicle wheels. Such units do not involve means for mechanically compensating the position of the plano-reflective means for run-out, but it does include means effective for determining wheel camber run-out compensation. The apparatus possessing these abilities without the usual manual compensation devices results in faster and more accurate results with equipment that is less expensive as it performs the essential measurement remotely from the selected wheels. The only manipulation of the selected wheels is that of rotating them to designated positions related to toe and to camber.

The practice of the present invention may be accomplished with sensor means of the type disclosed in the Senften U.S. Pat. No. 4,126,943 of Nov. 28, 1978, and with thrust line units of the type disclosed in the copending application of Lee Hunter, Ser. No. 942,302, filed Sept. 14, 1978, such units being modified and simplified by avoiding the mechanical run-out compensating means. Neither of these disclosures involves the measurement of wheel toe and camber compensation remotely from such wheels and by electronics means.

The determination of compensation for run-out present in vehicle wheels has been a problem and is the sort of important information that many alignment measuring apparatus are unable to check. There is another problem connected to determining the alignment of a vehicle wheel and that is most wheels have some degree of wobble or run-out which means that the plane of the wheel is not precisely perpendicular to its axis of rotation. Thus, instruments mounted on a wheel having a run-out condition will not produce an accurate alignment reading, unless compensation is provided.

The foregoing problems are especially acute in relation to non-steerable wheel alignment, but the apparatus of this invention is uniquely adapted to overcome the problems by coordinating sensor instruments of the type mounted on steerable wheels, as shown in Senften U.S. Pat. No. 3,892,042 of July 1, 1975 and U.S. Pat. No. 4,126,943 of Nov. 28, 1978, with plano-reflective means mounted on the non-steerable wheels. The coordination required is to electronically analyze non-steerable wheel angular position at selected positions of rotation by sensing the attitude of the plane of rotation of such wheel at the selected positions by the sensors remotely located, such as by being supported on the steerable wheels and transmitting the sensed information to circuit means which accomplish the computations necessary to produce the results sought. The foregoing brief explanation will be understood by reference to FIG. 1 and to the circuit diagram of FIG. 3.

BRIEF DESCRIPTION OF THE DRAWINGS

The present invention is shown in the accompanying drawings, wherein.

DETAILED DESCRIPTION OF THE INVENTION

An understanding of the present invention may be imparted most readily by describing the apparatus and its method of operation in relation to alignment characteristics of vehicle wheels, such as camber and toe of the wheels. The alignment of vehicle wheels is most often thought of in connection with the steerable or front wheels, and the alignment of the non-steerable or rear wheels is most often disregarded in the past. But recognition is beginning to be given to non-steerable wheel alignment and its effect on the overall steering and control results usually confined to steerable wheel alignment.

Figure 1:
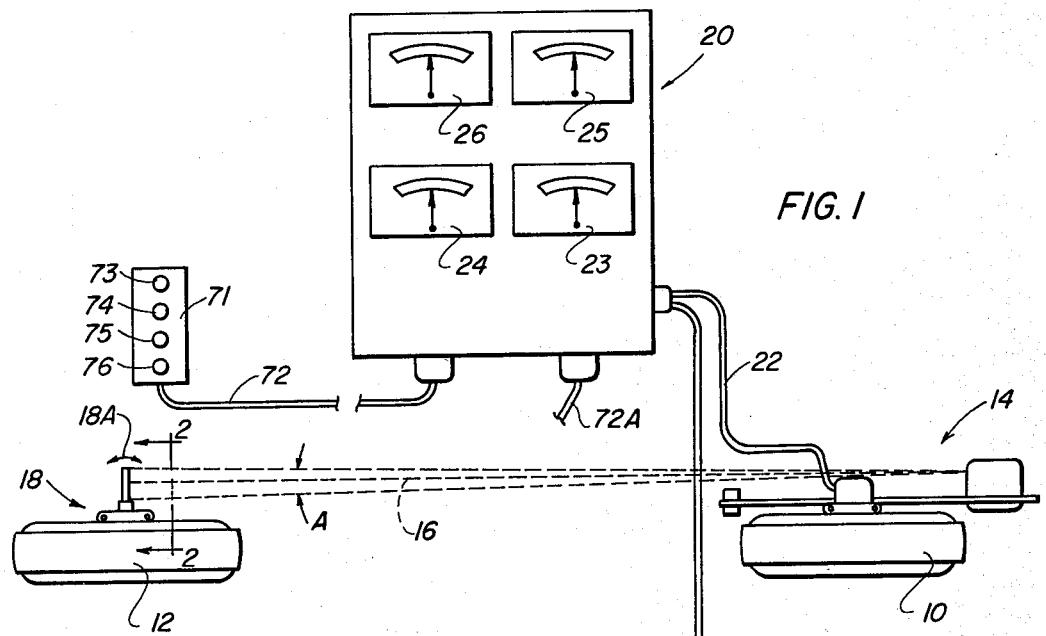
FIG. 1 is a schematic plan of the usual first and second sets of wheels of a vehicle with items of instrumentation associated therewith.

In FIG. 1, the usual four wheels of a vehicle are shown as a pair of steerable wheels 10 and 11 denoted as the first set, and a longitudinally spaced pair of non-steerable wheels 12 and 13 denoted as the second set. It is shown that sensor assemblies 14 and 15 are mounted on the wheels 10 and 11 in a manner shown in U.S. Pat. No. 4,126,943 of Senften which issued Nov. 28, 1978. The sensor assemblies include sources of radiant energy projected as a beam along the paths shown at 16 and 17 from the respective wheels 10 and 11. Each projected beam of radiant energy sweeps back and forth in a generally horizontal plane within an angular spread A of the desired amount so as to include target means mounted on the wheels 12 and 13. The target means consist of assemblies 18 and 19 supported on the second set of wheels. The target means support plano-reflective means supported so they will not rotate with the respective wheels. Thus, as the wheels 12 and 13 are rotated the plano-reflective means will hang plumb and swing to describe a sinusoidal motion which represents wobble run-out, as set forth in the U.S. Pat. No. 3,892,042 of Senften issued July 1, 1975. Looking at FIG. 1, the target assemblies will swing the plano-reflective means in the directions of arcs 18A and 19A. That arcuate motion will affect the path of the reflected beam of radiant energy 16 and 17 to an extent that sensor means in the assemblies 14 and 15 will generate signals which are the analog of the angular position of the plano-reflective means at the instant the sensor means pick up the returning beams. These signals are fed into a console 20 by leads 21 and 22 where electronic circuits process the signals in accordance with predetermined positions of the wheels 12 and 13. For example, the toe measurement of the wheels 12 and 13 is displayed at the respective meters 23 and 24, while camber compensation is displayed at meters 25 and 26, all as will be explained in the following description.

Figure 2:
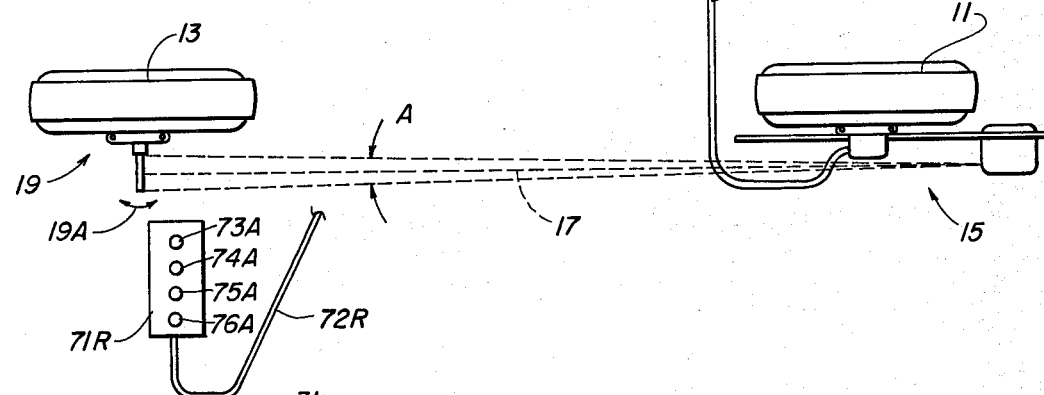
FIG. 2 is a typical mounting unit for the plano-reflective means which forms a part of the apparatus, the view being taken along line 2—2 in FIG. 1 at the left of the second set of wheels.

The wheel mounted assemblies 18 and 19 are best seen in FIG. 2 which represents the assembly 18. The assembly 19 is identical and need not be separately shown or described as is well understood. The assembly 18 includes a mounting adapter having slide rods 27 (one only being seen) which are fixed to a foot member 28 of a length to span a chordal dimension of a wheel rim so that hardened pins 29 (only one being seen) will engage the rim flange. The rods 27 also carry adjustable means 30 which has a hardened pin 31 to engage the rim flange, thus making up a three point connection of assembly adapter to the wheel rim flange. The slide rods 27 carry a body 32 which may be moved as necessary to locate a spindle 33 substantially in alignment with the axis of wheel rotation. The spindle 33 supports a body 34 which is free to swing on the spindle and is intended to hang penduluously as the wheel rotates.

The body 34 supports a frame 35 which carries a plano-reflective means 36 in position to be in the field of the sweep of the radiant energy beam 16 projected from the assembly 14. The means 36 is accurately located to by parallel with the axis of spindle 33 so that any swinging motion of the spindle in the direction of the arcuate arrow 18A will be imparted to means 36. In addition, the body 34 carries a camber device 37 which includes bubble levels 38 and 38A set at right angles to each other, while level 38 is parallel to spindle 33. This device is similar to one disclosed in Hunter U.S. Pat. No. 3,199,208, issued Aug. 10, 1965. A camber dial 39 is positioned on the device 37 such that its camber indicia on the periphery can be seen. The bubble level 38A should be centered to indicate that the body 34 is hanging plumb. The dial 39 is connected to the bubble level 38 to move it into centered position and the amount of movement of the dial 39 will indicate the camber angle of the wheel, provided run-out of the wheel has been compensated.

Figure 3:
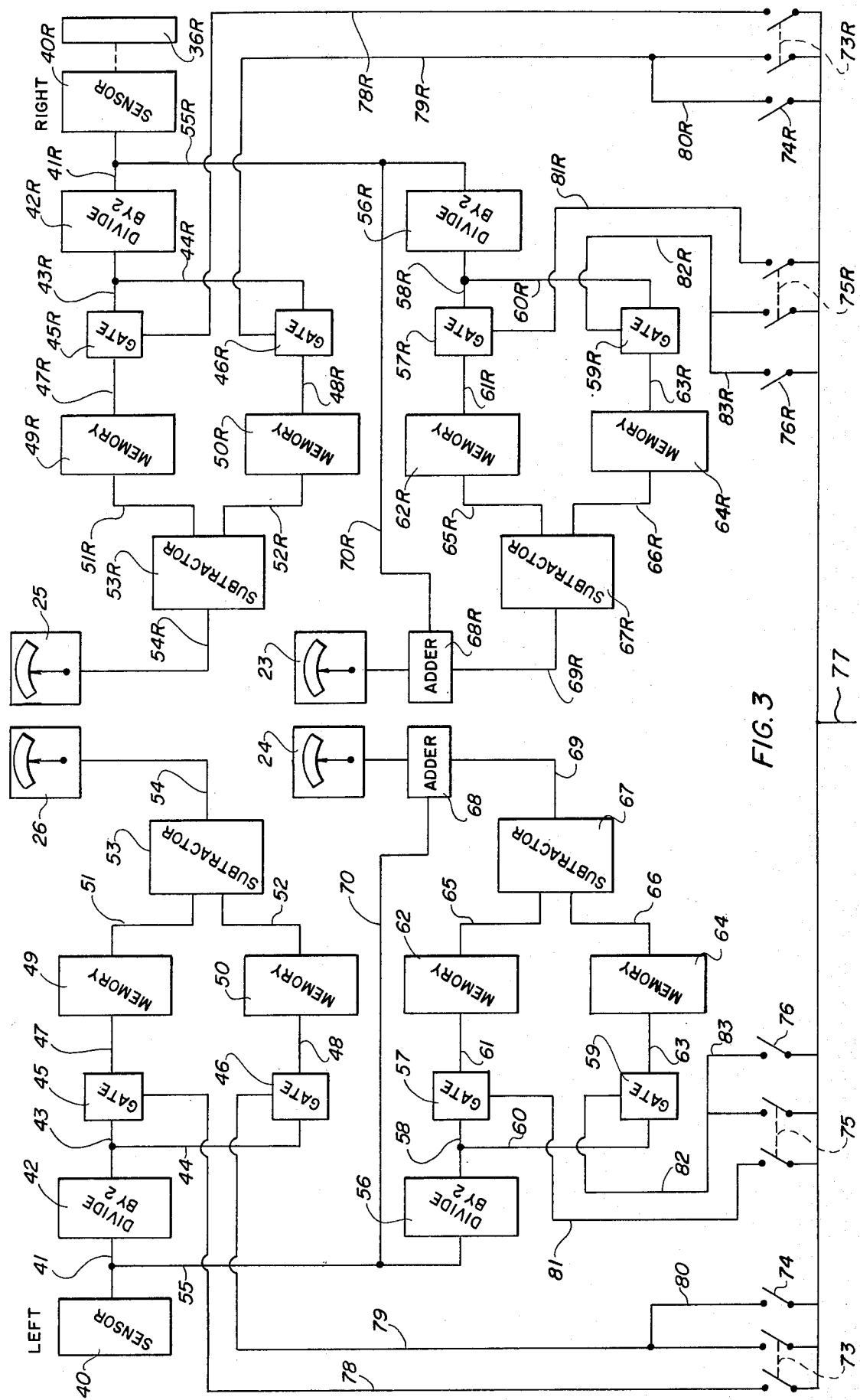
FIG. 3 is a circuit diagram showing the electronic components useful for processing generated signals representative of the vehicle wheels being investigated.

The present improvement relates to the interpretation of the responses of the foregoing apparatus by electronic means so that the toe and camber compensation for the wheels 12 and 13 may be determined quickly and with great accuracy. Reference will be directed to FIG. 3 for an understanding of the electronic circuits by which the responses of the apparatus seen in FIGS. 1 and 2 can be processed. Once the apparatus has been mounted on the wheels 12 and 13, it is necessary to jack up the wheels during the rotating procedure, and this can be done in any of the usual ways.

Beginning with the left wheels 10 and 12 in FIG. 1, it is seen (FIG. 3) that the sensor 40 in the assembly 14 generates a signal when the returning beam 16 wheel 12 is sensed. That signal is conducted by lead 41 to a divide by two circuit 42 and from that latter circuit leads 43 and 44 connect to gate means 45 and 46 respectively. These gates are connected by leads 47 and 48 to respective memory circuits 49 and 50, which are then connected by leads 51 and 52 to a subtractor circuit 53 from which a wheel camber compensation signal is conducted by lead 54 to the display meter 26. The same sensor 40 is able to generate other signals representing positions of the plano-reflective means 36 for different rotated positions of the wheels 12. Such signals are conducted by lead 55 to a divide by two circuit 56 which is connected to gate means 57 by lead 58 and to gate means 59 by lead 60. Gate means 57 is connected by lead 61 to a memory circuit 62, while gate 59 is connected by lead 63 to a memory circuit 64. These individual memory circuits 62 and 64 are connected by leads 65 and 66 to a subtractor circuit 67, and the latter circuit 67 is connected to an adder circuit 68 by lead 69. The same signal from lead 55 is directed by lead 70 to the adder circuit 68 and the result is displayed at meter 24.

The foregoing circuits associated with displays 24 and 26, and receiving signals from a common sensor 40 are controlled by a set of switches carried by a hand held control 71 (FIG. 1) connected into the console 20 by a bundle of leads in an umbilical line 72. Thus switches 73, 74, 75 and 76 in control 71 are readily available to an operator in position to manipulate the wheel 12 for causing the sensor 40 in the sensor assembly 14 at the first wheel 10 to generate signals having a specific relation to the second wheel 12 in terms of the longitudinal center line or geometric axis of the vehicle.

It can be seen in FIG. 3 that all of the switches have a common source of voltage by lead 77. Thus, on closing switch 73 the power is fed to lead 78 to open gate 45, and to lead 79 to open gate 46. When switch 74 is closed the power is fed by lead 80 into lead 79 so that only gate 46 is open. The gates 45 and 46 are in the camber compensating circuit. Closing of switch 75 connects the power source 77 by lead 81 to gate 57, and by lead 82 to gate 59. Switch 76 when closed connects the power source 77 by lead 83 to lead 82 whereby only gate 59 is opened.

In order to simplify the description relating to FIG. 3 it is deemed proper to utilize the same reference characters already applied to the circuits associated with displays 24 and 26 for the circuits associated with the displays 23 and 25 but to distinguish them by adding the letter R to signify that those circuits apply to the right side wheel 13 in working relation to the other right side wheel 11. With this explanation it should be easy to understand that the sensor 40R is responsive to the radiant energy beam 17 reflected from the plano-reflective means 36R at the wheel 13. The sensor 40R generates signals which are processed through the wheel toe circuits to display 23 and through circuits associated with the camber compensation display 25.

WHEEL TOE COMPENSATION

Referring to FIGS. 1 and 3, the toe alignment of the left wheel 12 is initiated once the radiant energy beam 16 is turned on and its projector has begun its sweep through the angle A. The operator stationed at the wheel 12 will press switch 75 to close the power circuit to gates 57 and 59 which open and energize the memories 62 and 64 with the signal generated by the sensor 40 in the assembly 14 at the existing position of the wheel 12 and its plano-reflective means 36. The operator deactivates switch 75 and turns wheel 12 through 180° and then closes only switch 76 which opens gate 59. The information admitted to memory 64 is subtracted from the previous information in memory 62, and the new resultant information is added in adder 68 directly from sensor 40. That resultant information is displayed at meter 24 in terms of wheel toe relative to the geometric center line of the vehicle.

The operator may elect to allow the display of toe at meter 24 to remain and move to the right side wheel 13 where the essentially same steps are taken. Thus, the operator can press switch 75 to open gates 57R and 59R so the signal at sensor 40R can be put into memories 62R and 64R. Switch 75R is released and switch 76R is pressed after rotating wheel 13 180° from its starting position, thereby opening only gate 59R which changes the information in memory 64R. The result is that information from memories 62R and 64R are subtracted in subtractor 67R. The resultant information is fed to adder circuit at 68R where it is combined with directly received signal in lead 70R from the sensor 40R. The result of the addition at display 23 is the toe of wheel 13 relative to the geometric center line of the vehicle. The information shown at displays 23 and 24 can be averaged to reveal the thrust line direction of these wheels relative to the geometric axis of the vehicle. Since each wheel 12 and 13 has been rotated to 180° and then back to its zero starting position, and the plano-reflective means 36 and its counter part (not designated in unit 19) have moved through a complete sine wave, compensation for run-out has been effected without manually compensating for run-out in the usual manner as disclosed in said Hunter copending application, Ser. No. 942,302. The advantage of this simple procedure is fast alignment measurement, avoidance of an intervening step of accounting for run-out, and more accurate results with less expensive equipment.

WHEEL CAMBER COMPENSATION

The apparatus described above is also capable of use in connection with compensating the run-out of wheels 12 and 13 relative to the camber alignment measuring means 37 (FIG. 2). The camber compensation or camber error is displayed at meters 25 and 26 upon appropriate rotational positions of the wheels 12 and 13 at 90° to the toe positions noted above. Thus camber compensation can be initiated for wheel 12 by rotating it 90° from its initial position, then closing switch 73 to open gates 45 and 46 which feeds memories 49 and 50 with the signal generated at sensor 40. Switch 73 is released and the wheel 12 is then rotated to a position 270° from its starting position (180° from the 90° position) and switch 74 is closed to open gate 46 which changes the information in memory 50. The information in memories 49 and 50 are subtracted and displayed at meter 26. The voltage value displayed at meter 26 can be scaled in degrees of camber error so that after adjusting the dial 39 to center the bubble in level 38, the dial reading needs to be corrected by the reading at the meter 26.

The camber alignment for the right side wheel 13 is obtained in the same manner by rotating the wheel in appropriate increments and closing the switches 73R and 74R at the 90° and 270° positions respectively.

COMBINED TOE AND CAMBER

The circuit of FIG. 3 for either left sensor 40 or right sensor 40R can be utilized with the hand held switches 71 and 71R to measure in one operation per side the toe alignment and the camber compensation error value at the respective meters 23, 24, 25 and 26. For the left side wheel 12, the wheel is jacked up so it can be rotated easily. The first step is to press switch 75 to set up memories 57 and 59 at the zero position. The wheel 12 is then rotated 90° and at that position switch 73 is closed to open gates 45 and 46 and set up memories 49 and 50 for zero camber. This is followed by rotating the wheel to a position 180° from its zero starting position and then closing switch 76 to enter the toe value in memory 59 which effects compensation for run-out in relation to toe. Thereafter, the wheel is rotated another 90° so it is 270° from its starting position and switch 74 is closed to enter camber error correction in memory 46. Finally, the wheel is rotated to its starting position which will complete the combined toe and camber error measurements.

An alternative use of the apparatus can be made by rotating the wheel 12 and finding the maximum position of deflection at the meter 24. At that wheel position for maximum deflection camber compensation will be zero, and the actual camber angle can be found at the dial 39 when the bubble in level 38 is centered. What is set forth for the left side wheel 12 will apply equally to the right side wheel 13.

SUMMARY

The foregoing disclosure has set forth particulars with respect to a preferred embodiment of the present invention which deals with a method and apparatus for sensing run-out in a rotary body, and particularly a rotary body which represents a wheel in a vehicle. The method is applied to finding run-out compensation characteristics of a rotary body mounted on a fixed axis in which the steps of the method include attaching a plano-reflective means to the rotary body in a predetermined relationship to the axis of rotation, projecting a radiant energy beam from a remotely selected location onto the plano-reflective means such that the beam will be reflected back toward the location from which it is projected, rotating the body into certain known positions to cause the plano-reflective means to move in a sinusoidal manner which causes the projected beam to move correspondingly, sensing the amount of sinusoidal motion of the projected beam and simultaneously generating separate and independent signals which correspond to the rotational orientation of the rotary body relative to its axis of rotation, and processing the generated signals so as to provide output readings relative to the run-out characteristics of the rotary body. The foregoing method produces several desirable pieces of information which are respectively related to obtaining run-out compensation in preparation for determining a camber alignment of the rotary body, and for obtaining substantially directly a determination of the toe alignment of the rotary body which incorporates run-out correction automatically.

The preferred apparatus for practicing the method of this information embodies sensor assemblies which can be conveniently supported on the first set of wheels of a vehicle so as to project radiant energy beams longitudinally and substantially parallel, or nearly so, to the geometric axis (longitudinally) of the vehicle. The second set of wheels are each provided with assemblies as shown in FIG. 2 which are arranged to support plano-reflective means for pendular positionment on axles which have been so related that the plano-reflective means 36 and the supporting axles 33 are substantially parallel and are incapable of being independently adjusted for wheel run-out characteristics. These items of apparatus are arranged to cooperate so that sensors located in the sensor assemblies at the steerable wheels are in position to generate signals which follow the sinusoidal motion of the plano-reflective means caused upon rotation of the non-steerable wheels. Those signals are transmitted into processing means located in a console where the results of the processing can be displayed for evaluation.

The processing means in the console 20 consists of electronic circuits which are activated by a series of hand manipulated switches carried by an operator located at the respective non-steerable wheels in order to perform the necessary incremental rotation of these wheels. In the determination of camber characteristics of the non-steerable wheels the assemblies mounted on the non-steerable wheels incorporate manually manipulated means to provide direct camber alignment information subject to being corrected by the information generated electronically in the console 20 and displayed to show the amount of run-out compensation to be applied to the final camber alignment determination.

What is claimed is:

1. A method for finding wobble run-out characteristics of a rotary body mounted on a fixed axis and using the findings to compensate measurement of its angular orientation relative to the fixed axis, said method comprising: attaching a plano-reflective means to the body in a predetermined relation to the fixed axis; projecting from a remote location a radiant energy beam onto the plano-reflective means; rotating the body into predetermined positions displaced from a known starting position to cause the plano-reflective means to move according to the existing wobble run-out and thereby causing the projected beam to move correspondingly, sensing the amount of said motion of the projected beam and generating separate and independent signals indicative of the rotational orientation of the body relative to the fixed axis at the predetermined positions; and processing the generated signals.

2. The method of claim 1, wherein the generated signals are processed by electronically subtracting the sensed signals corresponding to the predetermined positions which are 180° apart to find the wobble run-out relative to the fixed axis, and displaying the sensed signals.

3. The method of claim 1, wherein the generated signals are processed by electronically subtracting the sensed signals corresponding to the predetermined positions which are 180° apart to find the wobble run-out relative to the fixed axis, and displaying the sensed signals corrected by one-half the difference obtained from the signal subtraction, as an angular relation between the fixed axis and a desired axis.

4. A method for finding the run-out compensation characteristics of a vehicle wheel, said method comprising: providing the wheel with a run-out follower which moves in a path having a motion corresponding to the run-out present; locating a signal generating sensor in a fixed position spaced from the follower, projecting a radiant energy beam from the remote sensor in a direction to be intercepted by the run-out follower and to be returned by the run-out follower to the sensor for causing the generation of signals which are analogs of the amount of run-out present in the wheel for its positions of rotation from a predetermined initial position; and processing the generated signals at selected positions of rotation from the initial position in terms of the camber and toe alignment positions.

5. The method of claim 4, wherein the processing of the generated signals for the toe alignment is electronically performed.

6. The method of claim 4, wherein the processing of the generated signals for camber alignment is performed electromechanically.

7. A method for compensating and finding the camber characteristics of a vehicle wheel comprising: mounting a wheel wobble run-out follower and camber gauge on the vehicle wheel; projecting a radiant energy beam along a horizontal path from a remote fixed position upon the wobble run-out follower and reflecting the beam back toward the projector; generating an electrical signal by the reflected beam which represents a wobble run-out condition corresponding to the angular position of the wheel; rotating the wheel into a position where the generated signal resulting from the reflected beam is substantially the greatest; and adjusting the camber gauge to fine the camber characteristic for the wheel position corresponding to the maximum generated signals.

8. Apparatus for determining the wobble run-out characteristics of a rotatively mounted vehicle wheel, said apparatus comprising: a plano-reflective surface carried by the vehicle wheel so as to be movable in response to the presence of run-out during wheel rotation; means remote from said plano-reflective surface for projecting a radiant energy beam toward said surface; sensor means positioned to be in the path of the reflected radiant energy beam; means for generating signals which are the analog of the positions of the plano-reflective surface during wheel rotation; and means for processing generated signals at predetermined positions of said plano-reflective surface in terms of the presence of run-out for wheel rotation at such predetermined positions.

9. The apparatus set forth in claim 8 and including means for activating said processing means at said predetermined positions to determine wheel toe alignment.

10. The apparatus set forth in claim 8 and including means for activating said processing means at said predetermined positions to determine wheel camber run-out correction.

11. The apparatus set forth in claim 8 and including means for activating said processing means at said predetermined positions to determine separately wheel toe and camber run-out correction.

* * * * *

UNITED STATES PATENT AND TRADEMARK OFFICE
CERTIFICATE OF CORRECTION

PATENT NO. : 4,274,738
DATED : June 23, 1981
INVENTOR(S) : William J. Hollandsworth and Dean O. Grubbs It is certified that error appears in the above—identified patent and that said Letters Patent are hereby corrected as shown below:

Column 4, line 24, "by" should be "be".

Column 5, line 66, "75" should be "75R".

Column 9, line 7, "fine" should be "find".

Signed and Sealed this

Twenty-fifth Day of August 1981

[SEAL]

Attest:

GERALD J. MOSSINGHOFF

Attesting Officer — Commissioner of Patents and Trademarks